J. T. DAVIS.
EMULSIFYING APPARATUS.
APPLICATION FILED JULY 13, 1917.

1,269,399.

Patented June 11, 1918.

INVENTOR
JOHN T. DAVIS

BY F. M. Wright
ATTORNEY

UNITED STATES PATENT OFFICE.

JOHN T. DAVIS, OF ALAMEDA, CALIFORNIA, ASSIGNOR OF ONE-HALF TO JOSEPH ROTHSCHILD, OF SAN FRANCISCO, CALIFORNIA.

EMULSIFYING APPARATUS.

1,269,399.

Specification of Letters Patent. Patented June 11, 1918.

Application filed July 13, 1917. Serial No. 180,379.

*To all whom it may concern:*

Be it known that I, JOHN T. DAVIS, a citizen of the United States, residing at Alameda, in the county of Alameda and State of California, have invented new and useful Improvements in Emulsifying Apparatus, of which the following is a specification.

The object of the present invention is to provide an apparatus for emulsifying milk.

Figure 1:
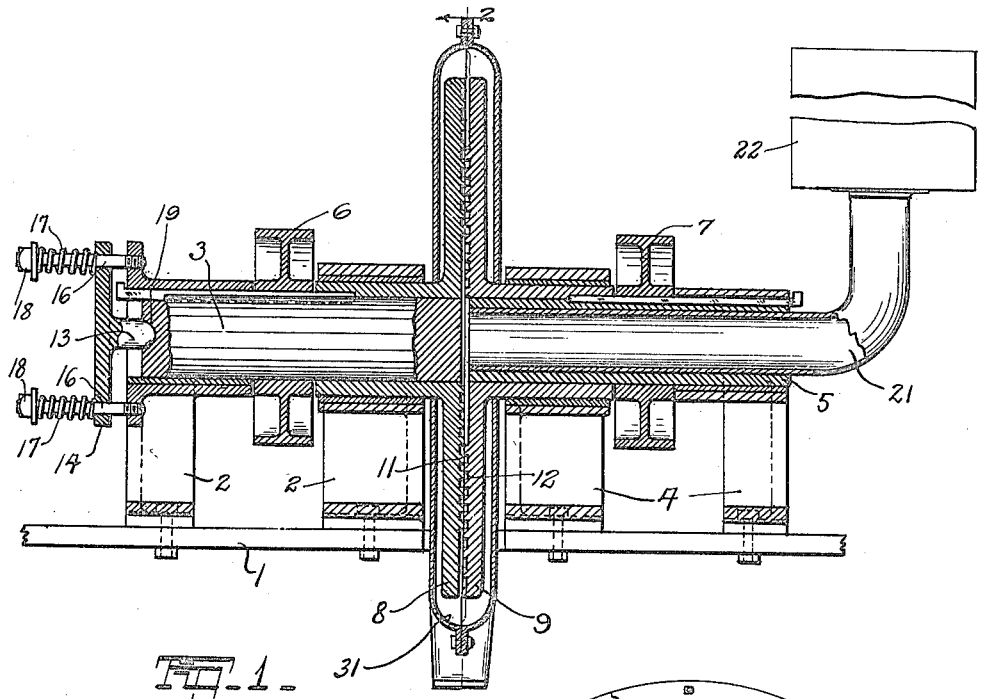
Figure 2:
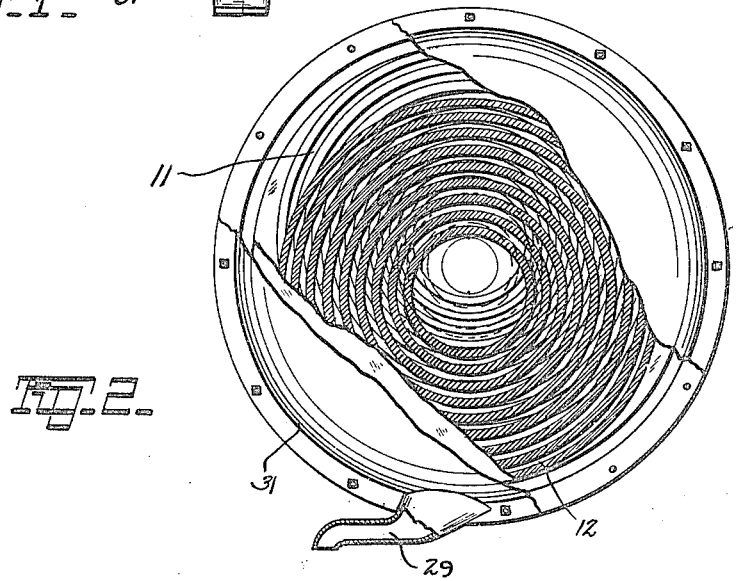

In the accompanying drawing, Figure 1 is a transverse section of the upper portion of my improved apparatus; Fig. 2 is a broken side view thereof.

Referring to the drawing, 1 indicates a suitable support, on which are supported bearings 2, for a rotary shaft 3, and bearings 4 for a tubular shaft 5. Said shafts have secured thereon pulleys 6, 7, by which they can be rotated, preferably at different speeds. The inner or opposing ends of said shafts carry disks 8, 9, each of which has formed on its inner surface, opposing that of the other disk, a series of concentric circular grooves 11, 12. The grooves of each disk, although concentric with each other, are, however, eccentric to the grooves in the other disk. Said disks are maintained in contact with each other by means of a pin 13 extending from a plate 14, guided by rods 16 extending from the outer bearings 2, said plate 14 being pressed toward said shaft 3 by springs 17 coiled around said rods 16 and compressed between said plate 14 and nuts 18 screwed on the outer ends of said rods 16. The pin 13 has a rounded end which bears in a socket 19 in the outer end of the shaft 3.

The milk is supplied by a conduit 21 leading from any suitable receptacle 22 into the interior of the tubular shaft 5, and is fed between the two disks 8, 9, by centrifugal force. The disks being pressed close against each other, the milk lies in the circular grooves 11, 12, in the disks, but escapes outward therefrom by centrifugal force, flowing between the disks outwardly into said grooves in succession. The mixture so treated can be discharged by a spout 29 leading from a casing 31 surrounding the disks. Owing to the grooves of the two disks being eccentric to each other, however, the edges of said grooves exert a shearing action upon the particles of the milk as they escape from each groove to the next succeeding groove, the inner edge of a groove of one disk coöperating with the outer edge of a groove of the other disk in the same manner as the cutting edges of a pair of shears. This action has the effect of breaking up the minute spherical envelops containing the particles of butter fat, thus enabling the butter fat to escape and be more readily assimilated with the particles of casein. It has been found by experience that a mere agitation of the butter fat and casein, even at a great velocity, is not sufficient to convert the mixture of butter fat and casein into a homogeneous mass. To so convert it, it is necessary to subject the globules of butter fat to a shearing action, thus freeing the butter fat from the inclosing film or membrane. By this mechanical action the fat and casein become perfectly mixed and a superior cream is obtained. This process may be carried out with the milk either in a hot or a cold condition, according to the uses for which the milk is intended. The milk is subjected to thousands of shearing cuts, varying in number with the spaces between the concentric grooves, thereby rendering it possible to reach every atom of the milk, and mix the butter fat and casein to a homogeneous consistency. At the same time the milk retains its original flavor. A great saving in the dairy industry is thus effected.

I claim:

In an apparatus for emulsifying milk, the combination of two disks, each formed with a series of concentric circular grooves, the grooves of one disk being eccentric to those of the other, means for pressing said disks together, and means for revolving said disks.

JNO. T. DAVIS.